Figure 1:
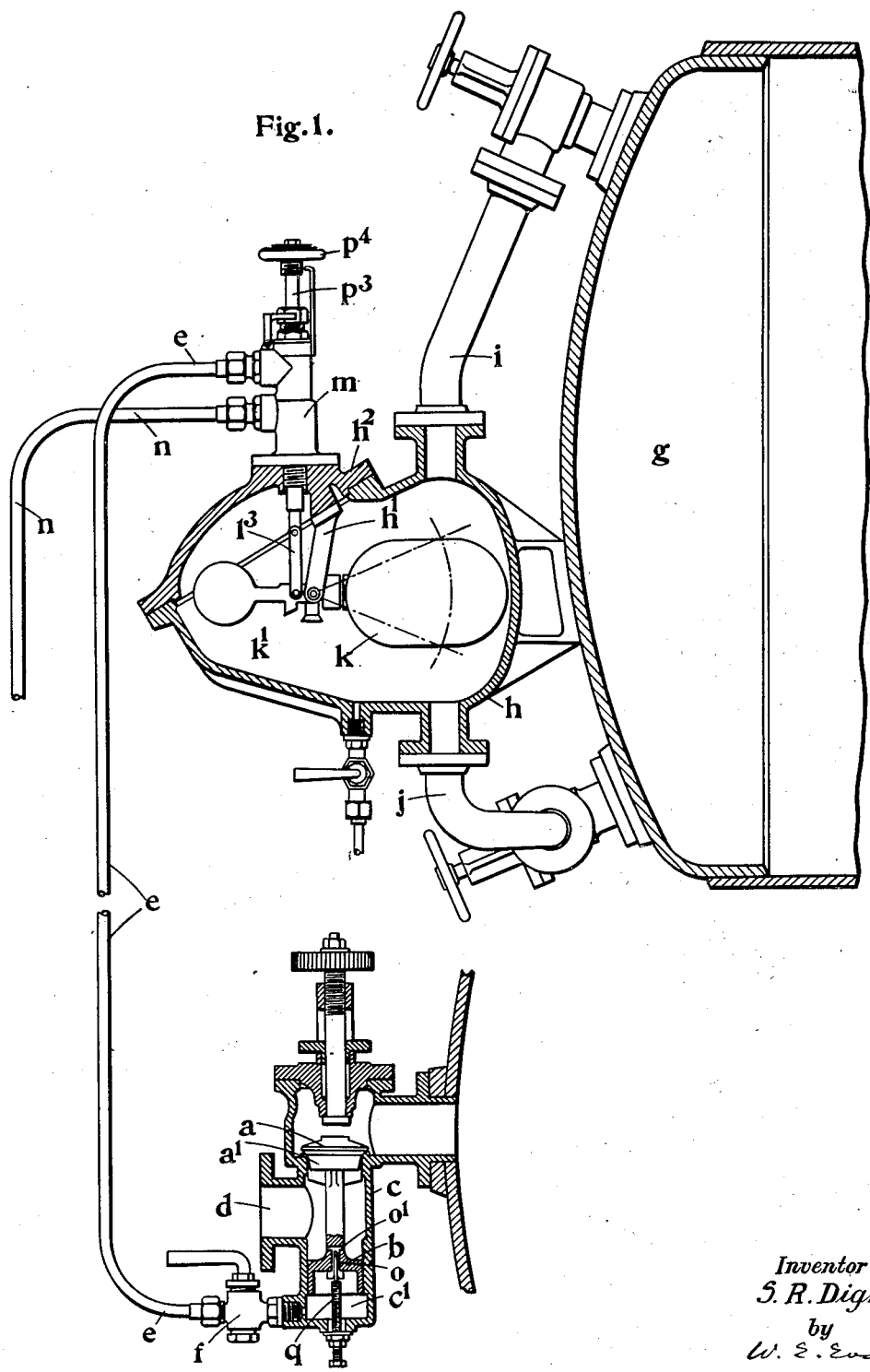

Nov. 13, 1934. S. R. DIGHT 1,980,749
AUTOMATIC FEED REGULATION OF LIQUID INTO WORKING CONTAINERS
Filed Feb. 3, 1932 2 Sheets-Sheet 1

Inventor
S. R. Dight:
by
W. E. Evans
Attorney.

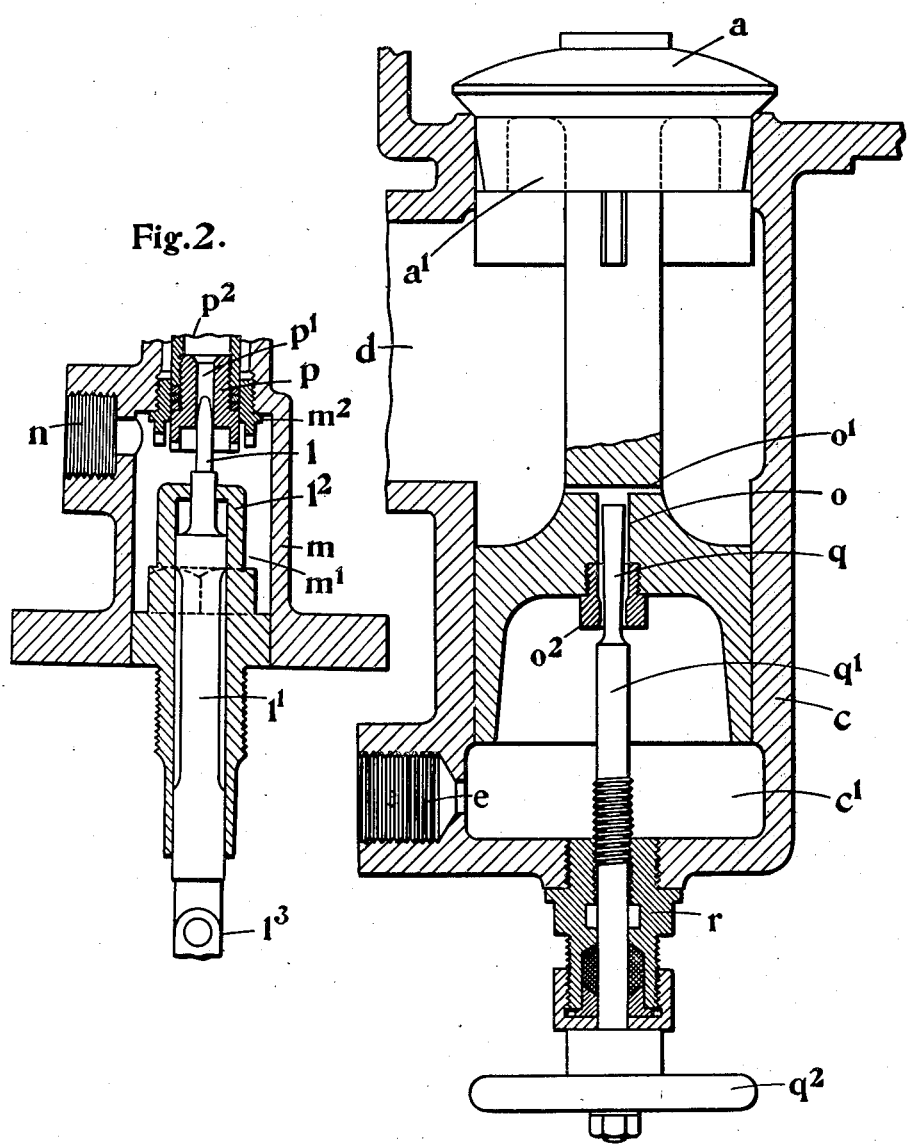

Patented Nov. 13, 1934

1,980,749

UNITED STATES PATENT OFFICE 1,980,749

AUTOMATIC FEED REGULATION OF LIQUID INTO WORKING CONTAINERS

Sydney Rupert Dight, Haslar, Gosport, England, assignor, by mesne assignments, to G. & J. Weir, Limited, Cathcart, Glasgow, Scotland, a corporation of the United Kingdom Application February 3, 1932, Serial No. 590,668 In Great Britain March 31, 1931

8 Claims. (Cl. 137—101)

This invention relates to apparatus for the automatic regulation of liquid supply for the maintenance of a substantially constant level of liquid in a container, such for example as a steam boiler, from which it is drawn off as vapour or liquid.

The invention relates to that type of regulator which is especially applicable to steam boilers in which leakage of water from beneath a feed valve past a connected and leaking piston into a chamber beneath the piston is controlled by a valve operated by a float within a chamber in free communication with the steam boiler or other container in which a substantially constant level of liquid is to be maintained, whereby as the level within the float chamber falls the float operated valve stops or reduces the flow of leakage water from beneath the piston so that the pressure on the feed valve builds up until it is sufficient to open the feed valve against the pressure within the boiler or container, and so allows the feed water or liquid to be pumped into the boiler or container.

The invention has among its objects to render the control of such a feed water regulator sensitive, whereby in normal working small variations in quantity of feed water pass through the feed valve, so that the latter tends to take up a more or less balanced position for each position of the float, and thus to ensure a steady feed water supply when the boiler is in use. The invention has also among its objects to provide means by which the extent of leakage permitted may be manually adjusted.

According to the invention the leakage of water to the chamber beneath the connected piston of the feed valve is adapted to be controlled by a throttle valve. The invention also comprises means for the manual adjustment of the throttle valve as well as the features hereinafter described.

The invention is illustrated by way of example in the accompanying drawings, in which Figure 1 is a general arrangement of an automatic feed water regulator applied to a water tube boiler, in which the invention is incorporated.

Figure 2 is a detail sectional elevation of the float controlled throttle valve, and Figure 3 a detail sectional elevation of the feed check valve and connected piston incorporating a throttle valve.

As illustrated in Figures 1 and 2 of the accompanying drawings the apparatus in which the invention is incorporated comprises the usual feed check valve $a$ whose stem has connected to or has mounted upon it a piston $b$ adapted to have sufficient clearance to work freely within the cylinder $c$ which forms part of the casing of the feed check valve, so that thus leakage results through a substantially constant area past the periphery of the piston which will vary with difference of pressures above and below the piston. By such means there is a substantially constant leakage, and the piston $b$ does not move out of the cylinder. The valve $a$ is advantageously provided with a skirting $a^1$ of tapering form that is adapted gradually to increase the area of opening on the raising of the valve, and thus to contribute to the sensitive control, which is one of the objects of the invention.

The delivery from the feed pump enters at $d$ under the check valve $a$ between the valve and the piston $b$, and the cylinder $c$ extends beneath the piston $b$ to form a chamber or clearance space $c^1$ with which a pipe $e$ is connected through which the leak-off water may pass when the cock $f$ is in the open position. The area of the top of the piston $b$ may advantageously be substantially equal to the area of the underside of the check valve $a$, and thus under normal conditions when leakage water flows away from beneath the piston, the valve may be balanced as regards feed water under pressure, and may thus be maintained in its closed position under pressure from the boiler.

The regulator comprises a float casing $h$ set in position preferably close to the end of the steam and water drum $g$ of the boiler, and its respective upper and lower ends are in communication with the upper and lower parts of the drum by means of the steam pipe $i$ and the water pipe $j$, each of which is provided with a valve. The float $k$ is mounted within the float casing $h$ upon a counter-balanced float lever $k^1$ pivotally carried on a bracket $h^1$ depending from the cover plate $h^2$ of the float casing, upon which the body or casing $m$ of the float operated valve is mounted and secured. The float operated valve $l$ is carried at the upper end of a spindle $l^1$ axially movable within a socket $l^2$ extending within the leak-off chamber or cavity $m^1$ provided at the lower part of the casing $m$, the socket $l^2$ being externally screw-threaded at its lower part and being adapted to be secured within a screw-threaded hole within the cover plate $h^2$ of the casing $h$ at a position around which the base part of the body or casing $m$ is secured. The lower end of the spindle $l^1$ is connected by a link $l^3$ to the float lever $k^1$ in such manner that variations in the position of the float $k$ due to variation of level of water in the drum $g$ causes movement to be imparted to the link $l^3$ and thus also to the spindle $l^1$ for raising or lowering the float operated valve $l$. The valve $l$ may advantageously be formed at its upper end of a substantially tapering shape and adapted for entry within the central cavity or orifice $p^1$ of a socket $p$ that is adapted to slide within a bush $m^2$ mounted within the lower end of the upper part of the body or casing $m$ above the chamber or cavity $m^1$. The socket $p$ is carried at the lower end of a tubular member $p^2$ secured at the lower end of the spindle $p^3$ and at the outwardly protruding end of which a hand wheel $p^4$ is mounted by which the socket $p$ may thus be adjusted in its relation to the valve $l$.

It will be understood that the annular space in the upper part of the body or casing $m$ surrounding the tubular member $p^2$ is separated from the chamber or cavity $m^1$ in the lower part of the body or casing $m$ by the bush $m^2$, and that suitable packing may be provided to maintain an effective joint around the tubular member $p^2$ as usual. At the upper end the tubular member $p^2$ is advantageously provided with a series of holes, by which the leakage water from below the piston $b$ received into the upper part of the body or casing $m$ may pass through the central cavity or orifice $p^1$ into the chamber or cavity $m^1$. Thus in the upper position of the valve $l$ consequent upon a lower level of the water within the float casing, the central cavity or orifice in the socket $p$ is partially or wholly closed, and the flow of the leakage water from beneath the piston $b$ through the pipe $e$ is throttled, and as the leakage water is thus hindered or prevented from escaping from beneath the piston $b$, the latter is put in equilibrium and under these conditions the pressure created in the operation of the feed pump becoming thus in excess of the boiler pressure, the feed check valve $a$ rises or opens and water passes into the boiler. When the valve $l$ assumes a lower position corresponding to a higher level of the water within the float casing $h$ the leakage water flows downwardly through the cavity or orifice $p^1$, into the chamber or cavity $m^1$ in the lower part of the body or casing $m$; and thence outwardly through the outlet pipe $n$ to the feed water tank or elsewhere, and under these conditions the leakage water escapes from beneath the piston $b$, and the feed check valve falls or closes.

In carrying the invention into effect as illustrated in Figure 3 of the accompanying drawings the piston $b$ is provided with a central cylindrical cavity or orifice $o$ which opens on the underside of the piston $b$ and communicates at its upper end by a transverse throughway passage $o^1$ with the annular space surrounding the stem above the piston and beneath the feed check valve $a$. At the lower end of the cavity or orifice $o$ a bush $o^2$ is mounted, the lower end of which is formed as a hexagonal nut, and the bore of the bush is contracted at its lower end. The cavity $o$ may be substantially cylindrical throughout its length, and it is adapted for the reception of the throttle valve $q$ which is advantageously formed integral with the valve spindle $q^1$. The latter is adapted to be carried within a socket $r$, and is provided for part of its length with an external screw-thread which passes through a corresponding screw-threaded part of the socket $r$. The socket $r$ is suitably packed, and the downwardly extending end of the spindle $q^1$ is adapted to be moved vertically for the longitudinal adjustment of the valve $g$ within the cavity or orifice $o$ and with respect to the bush $o^2$. For this purpose the outer end of the spindle $q^1$ has mounted upon it an operating wheel $q^2$, and the valve $q$ is provided tapered, so that as the feed valve $a$ rises or opens, the flow of water through the cavity or orifice $o$ is throttled.

The outlet cavity or orifice $o$ in the piston $b$ may be made tapering instead of or in addition to the valve $q$ being provided of a tapering form, with the object of effectively graduating the throttling of the leak-off water.

By such means the leakage into the actuating chamber $c^1$ is throttled in such manner that the feed is steady whereby small variations in quantity of the feed water are forced in at a time without sudden and considerable movements of the feed valve in opening and closing, and thus a substantially steady and continuous feed supply is ensured. By such means substantial constancy of level is maintained, it being found that by suitably adjusting the relation of the valve $q$ with respect to its cavity or orifice, the feed valve tends to take up a more or less balanced position for each position of the float.

Any suitable abutments may be provided to limit the travel of the feed valve and the float operated valve $l$. Similarly the cavity or orifice of the float operated leak-off valve may be made tapering instead of or in addition to the tapering form of the valve $l$.

It will be understood that instead of a piston and cylinder, a diaphragm may be used, to which the stem of the feed check valve may be connected.

I claim:

1. Apparatus for automatically regulating the feed of liquid into containers against pressure, comprising a feed inlet valve, a seat upon which the said valve rests to interrupt the feed, a piston in fixed relation to said feed inlet valve with the seat in interposed position, a chamber in which the said piston moves, said chamber being closed by said piston, a float-operated valve responsive to the variations of the level of liquid in the container and closed when the float falls, a passage for leakage from said chamber controlled by said float-operated valve, and a throttle valve determining the entry of liquid from the feed supply into the chamber and serving gradually to arrest the said entry of liquid on movement of the piston to open the feed inlet valve.

2. Apparatus for automatically regulating the feed of liquid into containers against pressure, comprising a feed inlet valve, a seat upon which the said valve rests to interrupt the feed, a piston in fixed relation to said feed inlet valve with the seat in interposed position, a chamber in which the said piston moves, said chamber being closed by said piston, a float-operated valve responsive to the variations of the level of liquid in the container and closed when the float falls, a leak-off passage connected to said chamber and controlled by said float-operated valve, and a throttle valve controlled by the piston and progressively throttling the inlet of liquid from the feed supply into the chamber as the piston rises under pressure created in the said chamber.

3. Apparatus for automatically regulating the feed of liquid into containers against pressure, comprising a feed inlet valve, a seat upon which the said valve rests to interrupt the feed, a piston in fixed relation to said feed inlet valve with the seat in interposed position, a chamber in which the said piston moves, said chamber being closed by said piston, a float-operated valve responsive to the variations of the level of liquid in the container and closed when the float falls, a leak-off passage connected to said chamber and controlled by said float-operated valve, a passageway through said piston for the inlet of liquid into the said chamber, and a needle valve extending into said passageway, the relative forms of the passage and the needle valve serving progressively to throttle the inlet of liquid from the feed supply into the said chamber as the piston rises under pressure created in the said chamber.

4. Apparatus for automatically regulating the feed of liquid into containers against pressure, comprising a feed inlet valve, a seat upon which the said valve rests to interrupt the feed, a piston in fixed relation to said feed inlet valve with the seat in interposed position, a chamber in which the said piston moves, said chamber being closed by said piston, a float-operated valve responsive to the variations of the level of liquid in the container and closed when the float falls, a leak-off passage connected to said chamber and controlled by said float-operated valve, a passageway through said piston for the inlet of liquid from the feed supply into the said chamber, and a needle valve extending into said passageway, said needle valve being of a gradually varying cross-sectional area so that the passageway is gradually throttled as the piston rises under pressure created in the said chamber.

5. Apparatus for automatically regulating the feed of liquid into containers against pressure, comprising a feed inlet valve, a seat upon which the said valve rests to interrupt the feed, a piston in fixed relation to said feed inlet valve with the seat in interposed position, a chamber in which the said piston moves, said chamber being closed by said piston, a float-operated valve responsive to the variations of the level of liquid in the container and closed when the float falls, a leak-off passage connected to said chamber and controlled by said float-operated valve, a passageway through said piston for the inlet of liquid into the said chamber, said passageway being of a gradually varying cross-sectional area, and a needle valve extending into said passageway so that the passageway is gradually throttled as the piston rises under pressure created in the said chamber.

6. Apparatus for automatically regulating the feed of liquid into containers against pressure, comprising a feed inlet valve, a seat upon which the said valve rests to interrupt the feed, a piston in fixed relation to said feed inlet valve with the seat in interposed position, a chamber in which the said piston moves, said chamber being closed by said piston, a float-operated valve responsive to the variations of the level of liquid in the container and closed when the float falls, a leak-off passage connected to said chamber and controlled by said float-operated valve, a passageway through said piston for the inlet of liquid into said chamber, a needle valve extending into said passageway, said needle valve and said passageway being of differently varying cross-sectional areas so that the passageway is gradually throttled as the piston rises under the pressure created in the chamber.

7. Apparatus for automatically regulating the feed of liquid into containers against pressure, comprising a feed inlet valve, a seat upon which the said valve rests to interrupt the feed, a piston in fixed relation to said feed inlet valve with the seat in interposed position, a chamber in which the said piston moves, said chamber being closed by said piston, a float-operated valve responsive to the variations of the level of liquid in the container and closed when the float falls, a leak-off passage connected to said chamber and controlled by said float-operated valve, and a throttle valve controlled by said piston and determining the inlet of liquid into the said chamber, the said throttle valve being provided for manual adjustment.

8. Apparatus for automatically regulating the feed of liquid into containers against pressure, as set forth in claim 7, wherein the throttle valve comprises a needle valve adjustable axially by means of a screw thread, said needle valve being carried in a screw-threaded seating and provided with an adjusting element.

SYDNEY RUPERT DIGHT.